US008090485B2

(12) United States Patent
Grinits et al.

(10) Patent No.: US 8,090,485 B2
(45) Date of Patent: Jan. 3, 2012

(54) LOW-FREQUENCY FLIGHT CONTROL SYSTEM OSCILLATORY FAULTS PREVENTION VIA HORIZONTAL AND VERTICAL TAIL LOAD MONITORS

(75) Inventors: Erick Vile Grinits, Sao Jose dos Campos (BR); Marco Antonio de Oliveira Alves Junior, Sao Jose dos Campos (BR); Dagfinn Gangsaas, Sao Jose dos Campos (BR); Roberto Garcia Negrao, Sao Jose dos Campos (BR); Bianca Prazim Trotta, Sao Jose dos Campos (BR); Fabiano Prieto Silva, Sao Jose dos Campos (BR); Mauricio Martins de Almeida Filho, Sao Jose dos Campos (BR); Marco Antonio Coccolin, Sao Jose dos Campos (BR); Karina Sanches Garcia, Sao Jose dos Campos (BR); Daniel Carmona de Campos, Sao Jose dos Campos (BR); Cristina Minioli Saracho, Sao Jose dos Campos (BR); Fernando Jose de Oliveira Moreira, Sao Jose dos Campos (BR)

(73) Assignee: Embraer S.A., Sao Paulo (BR)

(*) Notice: Subject to any disclaimer, the term of this patent is extended or adjusted under 35 U.S.C. 154(b) by 1036 days.

(21) Appl. No.: 11/945,382

(22) Filed: Nov. 27, 2007

(65) Prior Publication Data

US 2009/0138147 A1 May 28, 2009

(51) Int. Cl.
*G08B 17/12* (2006.01)

(52) U.S. Cl. ........... 701/14; 701/8; 73/570; 73/577; 73/579; 73/583; 244/174; 244/99.13; 340/945; 340/963

(58) Field of Classification Search .................. None
See application file for complete search history.

(56) References Cited

U.S. PATENT DOCUMENTS

| 3,665,217 | A |   | 5/1972  | Adams et al.       |         |
|-----------|---|---|---------|--------------------|---------|
| 3,678,256 | A |   | 7/1972  | Harenberg, Jr.     |         |
| 4,302,745 | A | * | 11/1981 | Johnston et al.    | 340/963 |
| 4,706,902 | A | * | 11/1987 | Destuynder et al.  | 244/76 C|
| 5,319,296 | A | * | 6/1994  | Patel              | 318/611 |
| 5,359,326 | A | * | 10/1994 | Bivens et al.      | 340/971 |
| 5,511,430 | A | * | 4/1996  | Delest et al.      | 73/802  |
| 5,549,260 | A | * | 8/1996  | Reed, III          | 244/195 |

(Continued)

OTHER PUBLICATIONS

Funk, Jack and Rhyne, Richard H., "An Investigation of the Loads on the Vertical Tail of a Jet-Bomber Airplane Resulting From Flight Through Rough Air," National Advisory Committee for Aeronautics, Technical Note 3741, (Oct. 1956).

(Continued)

*Primary Examiner* — Tuan C. To
*Assistant Examiner* — Jonathan M Dager
(74) *Attorney, Agent, or Firm* — Nixon & Vanderhye PC

(57) ABSTRACT

The Tail Load Monitoring System detects faulty low frequency (e.g. those in the range from 0.1 to 1 Hz) oscillatory conditions caused by Flight Control System malfunctions while the aircraft is in air by means of a continuous assessment of the estimated tail load behavior and data processing. Both estimation and data processing activities are provided by a dedicated architecture featuring a tail load estimation module, a band-pass filter and three independent paths that continuously monitor nuisance fault detection events avoidance, catastrophic events avoidance (addressing a limit load criterion), and structural damage avoidance (addressing fatigue life criteria).

9 Claims, 2 Drawing Sheets

U.S. PATENT DOCUMENTS

| | | | |
|---|---|---|---|
| 5,641,133 A * | 6/1997 | Toossi | 244/17.27 |
| 5,881,971 A | 3/1999 | Hickman | |
| 6,125,333 A * | 9/2000 | Pun | 702/42 |
| 6,289,274 B1 * | 9/2001 | Martucci et al. | 701/100 |
| 6,375,127 B1 * | 4/2002 | Appa | 244/215 |
| 7,191,985 B2 * | 3/2007 | Najmabadi et al. | 244/195 |
| 7,271,741 B2 * | 9/2007 | Delaplace et al. | 340/945 |
| 7,338,011 B2 * | 3/2008 | Pauly | 244/99.14 |
| 7,699,269 B2 * | 4/2010 | Pitt | 244/174 |
| 7,725,224 B2 * | 5/2010 | Goupil | 701/29 |
| 2003/0158676 A1 * | 8/2003 | Fields et al. | 702/42 |
| 2006/0287809 A1 | 12/2006 | Lebrun | |
| 2008/0177456 A1 * | 7/2008 | Hill et al. | 701/100 |

OTHER PUBLICATIONS

L. S. Wisler, "An investigation of oscillations in an adaptive aircraft control system under large input commands," (Report), Naval Postgraduate School, Monterey, CA, Jun. 1969 (Abstract).

Dornheim, Michael A., "Flight 587 Probe Shows Tails Have Been Overloaded," Aviation Week (2005).

Search report from PCT/BR2008/00275, W02009/067768 A3 (Published Feb. 4, 2010).

* cited by examiner

LOW-FREQUENCY FLIGHT CONTROL SYSTEM OSCILLATORY FAULTS PREVENTION VIA HORIZONTAL AND VERTICAL TAIL LOAD MONITORS

CROSS-REFERENCES TO RELATED APPLICATIONS

None.

STATEMENT REGARDING FEDERALLY SPONSORED RESEARCH OR DEVELOPMENT

None.

TECHNICAL FIELD

The technology herein relates to a new concept for detecting low frequency persistent oscillatory signals generated by a Flight Control System malfunction that causes faulty persistent aircraft surface oscillations, namely the Tail Load Monitoring Concept.

BACKGROUND AND SUMMARY

An aircraft pilot adjusts the position (orientation) of surfaces such as rudders and elevators so as to control the aircraft's flight. In traditional aircraft designs, cables and other mechanical components directly link the control stick to the surfaces, usually with the help of actuators. Modern aircraft designs, on the other hand, feature complex electronic components within their Flight Control Systems, thereby introducing new variables and data processing platforms (computers, electronic circuitry) in the control loop absent from purely mechanical Flight Control Systems. At the same time that many new and useful functionalities are brought on, a more complex Flight Control System presents itself with the possibility of containing several distinctive sources of faulty behavior—such as, for example, wrong oscillatory inputs coming from a malfunctioning Flight Control Computer and sent to the control surfaces. Faulty persistent surface (e.g. rudder and/or elevator) oscillations while an aircraft is in air, when not correctly detected, may lead to structural damage due to cumulative loads that can exceed the aircraft designed oscillatory envelope and, eventually, may result in catastrophic events, especially in those cases when limit loads are repeatedly reached. In other words, under such persistent oscillations, control surfaces can permanently deform, crack or even snap off the aircraft.

Current methodologies for aircraft oscillatory fault detection due to Flight Control System malfunctions are generally based solely on surface oscillations data, i.e. the fault detection process typically takes into account only amplitudes, moments and frequencies of surface (rudder/elevator) oscillations as measured by sensors used to detect such oscillations.

In this sense, for instance, a method and device for detecting an overstepping of design loads of the fin of an aircraft caused by Flight Control System malfunctions is described by U.S. Pat. No. 7,271,741. In this document, "design loads" mean the maximum loads that can be supported by the fin without permanent deformations. Whether design loads are being overstepped can be determined by means of an assessment of its bending and twisting moments, which are simultaneously and constantly monitored during the flight of the aircraft, their values being compared with a safety envelope.

Methods based solely on surface oscillations—such as the one just mentioned—could be effective for medium and high frequencies oscillations, i.e. those in the range, for example, from 1 Hz to 20 Hz (approximately, depending on the aircraft). However, for low frequencies, i.e. those in the range between, for example, 0.1 Hz and 1 Hz (approximately, depending on the aircraft), there can be problems, namely:

It becomes difficult to clearly separate oscillatory commands caused by a Flight Control System fault from non-faulty oscillatory commands caused by the pilot (pilots' range of operation is between 0.1 Hz and 1 Hz). This means that a real fault may not be detected by this approach.

Rigid body dynamics that occur in frequencies from 0.1 Hz to 1 Hz may prevent this approach's compliance with fatigue and limit load avoidance requirements. This means that severe fault conditions, such as those leading to a limit load-reaching scenario, may not be properly detected.

U.S. Pat. No. 5,319,296 describes an oscillatory servo-valve fault monitor that aims at identifying faults attributable to servo-control system components. Similarly to the method of U.S. Pat. No. 7,271,741, this approach also takes into account only the control surface behavior, i.e. the monitoring process can be regarded as a purely local one, not considering the overall aircraft operational status, namely: it does not assess the real time surface load behavior and it does not occupy itself with the structural impacts deriving from a persistent faulty oscillation before it is detected (i.e. regarded as a fault). Moreover, it does not clearly address fatigue life consumption criteria nor solid guidelines are provided as far as how to deal with a limit load-reaching event is concerned. Finally, and more importantly, the method is also not clear as to how oscillatory commands caused by a Flight Control System fault are not to be mistaken for non-faulty oscillatory commands caused by the pilot, which means that a real fault may not be detected by this method.

It hence becomes necessary to devise a new, highly reliable methodology to detect low frequency persistent oscillatory signals generated by a Flight Control System malfunction that does not allow nuisance fault detection events and does not fail to detect real fault events.

The exemplary illustrative non-limiting technology described herein provides a Tail Load Monitoring System that detects faulty low frequency (e.g. those in the range from 0.1 to 1 Hz) oscillatory conditions caused by a Flight Control System malfunction while the aircraft is in air by means of a continuous assessment of the estimated tail load behavior and some data processing. Estimation and data processing activities are provided by a dedicated architecture, i.e. a Tail Load Monitor.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

There are two kinds of tail load monitoring activities: one related to the vertical tail and one related to the horizontal tail.

Figure 1:
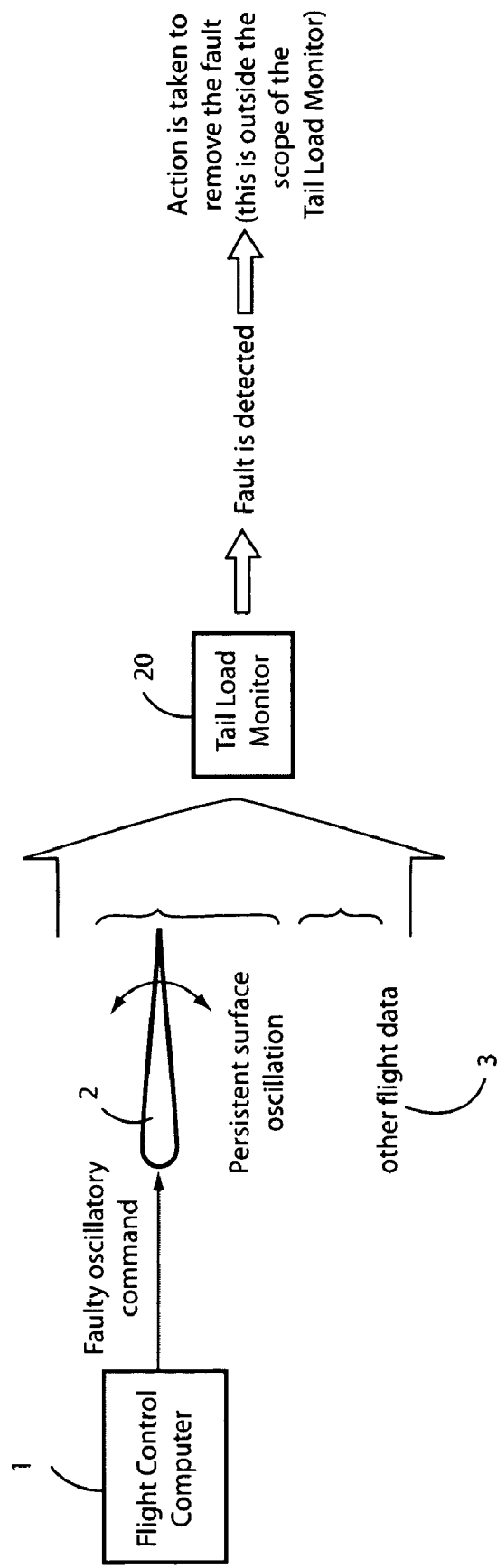
FIG. 1 is a schematic drawing of a exemplary illustrative non-limiting fault detection process as performed by the advanced Tail Load Monitoring Concept.
Figure 2:
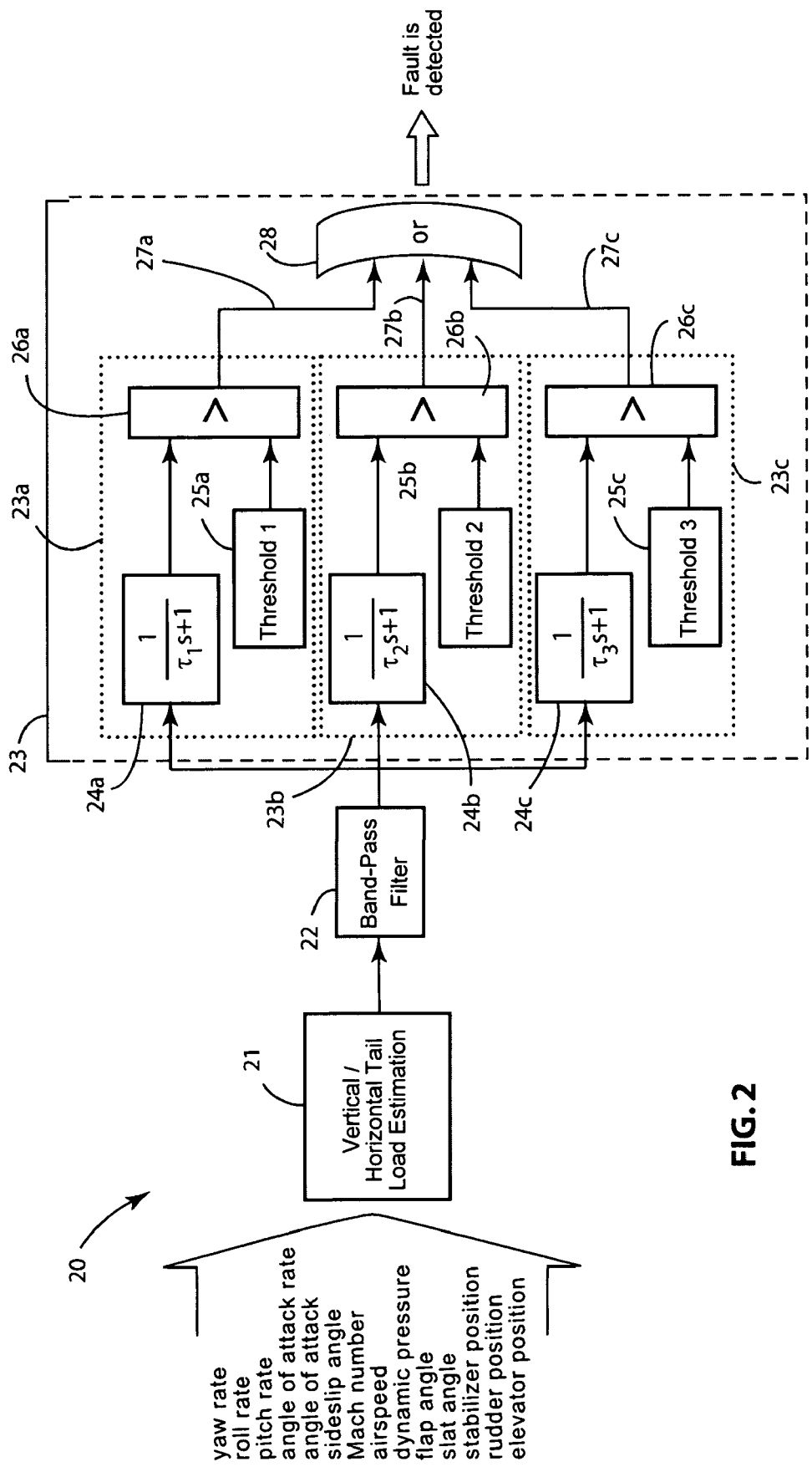
FIG. 2 shows the basic exemplary illustrative non-limiting architecture shared by both Vertical and Horizontal Tail Load Monitors.

Therefore, the exemplary illustrative non-limiting Tail Load Monitoring System 20 as shown in FIG. 1 can be either a Vertical Tail Load Monitor or a Horizontal Tail Load Monitor. In other words, both Vertical and Horizontal Tail Load Monitors share the same basic exemplary illustrative non-limiting architecture, an implementation of which is illustrated in FIG. 2.

Their mitigation effects scope comprises, respectively, unwanted persistent rudder and elevator oscillations (that may result, for example, from simultaneous faults in multiple lanes of a digital processing unit such as the one depicted in FIG. 1), that exceed the designed oscillatory envelope for low frequencies.

The exemplary illustrative non-limiting Vertical and Horizontal Tail Load Monitors thus protect the aircraft from structural damage that can arise as a consequence of continually increasing cumulative load magnitudes brought about by these persistent rudder and elevator oscillations.

The flight control system malfunction shown by way of example in FIG. 1 is a faulty oscillatory command generated by Flight Control Computer 1. This faulty command causes the surface 2 (e.g., a rudder, an elevator) to persistently oscillate. Surface 2 position plus other flight data 3 (shown in FIG. 2) are inputs to the Tail Load Monitor system 20 that will detect the flight control system faults.

As shown in the exemplary illustrative non-limiting implementation of FIG. 2, vertical and horizontal tail load estimates 21 are calculated by means of several formulae and tables whose inputs are the following flight data:

Yaw Rate,
Roll Rate,
Pitch Rate,
Angle of Attack Rate,
Angle of Attack,
Sideslip Angle,
Mach Number,
Airspeed,
Dynamic Pressure,
Flap Angle,
Slat Angle,
Horizontal Stabilizer Position,
Rudder Position,
Elevator Position.

These formulae and tables are aircraft-specific and may be determined empirically through wind tunnel or other testing for example. The vertical tail load estimate comprehends both fin and rudder. The horizontal tail load estimate comprehends both horizontal stabilizer and elevator.

In the exemplary illustrative non-limiting implementation, the estimated load signal 21 (be it a vertical tail load estimate or a horizontal tail load estimate) passes through a band-pass filter 22 with an adequate frequency range so as to remove the offset and the high-frequency content of the incoming tail load estimate signal (e.g. between 0.1 Hz and 1 Hz, depending on the aircraft). In the exemplary illustrative non-limiting implementation, this frequency range defines the monitors' frequency scope.

Once the estimated load signal 21 is filtered, the resulting signal is then inputted to a tripartite structure 23 that performs the fault detection process according to maximum fatigue life consumption, limit load avoidance and nuisance fault detection avoidance criteria.

Specifically, in the exemplary illustrative non-limiting implementation, the tripartite structure 23 features three parallel data processing lanes or pathways 23a, 23b, 23c, each of which with a first-order filter 24a, 24b, 24c, a threshold level 25a, 25b, 25c and a comparison gate 26a, 26b, 26c. The comparison gate's 26a, 26b, 26c function is to determine whether the outcome signal from the adjacent first-order filter 24a, 24b, 24c is greater than its respective threshold 25a, 25b, 25c.

The three signals 27a, 27b, 27c coming from the comparison gates 26a, 26b, 26c are finally inputted to a logical OR gate 28 whose output serves as an indication as to whether an oscillatory fault has occurred. Consequently, it can be said that the detection process is actually performed by the comparison gates 26a, 26b, 26c while the indication that a fault has occurred is provided by the output of the OR logic gate 28.

Such signal processing as described above can be performed by a variety of structures including, but not limited to, a digital computer, digital circuitry, a digital signal processor(s), a microprocessor, or by other suitable means.

As mentioned, this monitoring process is carried out on-line throughout the whole flight. An oscillatory envelope exceedance due to a faulty oscillatory command is detected whenever one of the three comparison gates (tripartite structure 23) is set (i.e. a logical TRUE).

The oscillatory fault detection process, therefore, takes into account the cumulative load stored in the first-order filters 24a, 24b, 24c (which act as integrators) resulting from rudder/elevator faulty persistent oscillations. The time constants $\tau_1$, $\tau_2$ and $\tau_3$ of the first-order filters 24a, 24b, 24c determine how much the signal is retained to be compared with the thresholds 25a, 25b, 25c, that define the detection values boundaries.

The numerical values for the three time constants $\tau_1$, $\tau_2$ and $\tau_3$ of the first-order filters 24a, 24b, 24c and for the three thresholds 25a, 25b, 25c are determined based on maximum fatigue life consumption, limit load avoidance and nuisance fault detection avoidance criteria.

The means by which the estimated load data is processed in order to ensure that the oscillations remain smaller than the aircraft oscillatory envelope is given by the above-mentioned tripartite structure 23 configuration. In the exemplary illustrative non-limiting implementation, each lane or pathway of this structure performs a different and dedicated role, defined by the combination of first-order filters' 24a, 24b, 24c time constants and threshold 25a, 25b, 25c magnitudes. These roles are the same in the Vertical Tail Load Monitor and in the Horizontal Tail Load Monitor, only the numerical values differ.

In the exemplary illustrative non-limiting implementation, the first lane or pathway 23a focuses on nuisance fault detection events avoidance, the second lane or pathway 23b focuses on catastrophic events avoidance (addressing a limit load criterion), while the third lane or pathway 23c focuses on damage avoidance (addressing fatigue life criteria).

In the exemplary illustrative non-limiting implementation, each of the three lanes 23a, 23b, 23c features the same structure, that is, a comparison gate 26a, 26b, 26c that determines whether the outcome signal magnitude of a first-order filter 24a, 24b, 24c is greater than its associated threshold 25a, 25b, 25c. The combination of the three lanes or pathways 23a, 23b, 23c acting together in parallel cover the aircraft oscillatory envelope and its boundaries—the reaching of the latter being equivalent to a fault detection. The resulting ORed fault detection output can be used to correct the fault in any of a number of ways (e.g., alter the control input, set off an alarm, alter the servo control system operation, etc.)

All in all, the advanced exemplary illustrative non-limiting Tail Load Monitoring System 20 detects low frequency persistent oscillatory signals generated by a Flight Control System malfunction through the use of an on-line estimation of the load behavior via flight data processing. In other words, this method is not based solely on surface oscillations data as seen in certain prior art approaches. By means of the exemplary illustrative non-limiting three independent lanes or pathway 23a, 23b, 23c architecture, it is possible to avoid fatigue life consumption and limit load-reaching events, besides practically eliminating the occurrence of nuisance fault detections. Consequently, the Tail Load Monitoring System 20 has many advantages.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method for detecting faulty low frequency persistent oscillations signals generated by a Flight Control System malfunction that causes faulty persistence aircraft surface oscillations comprising:

sensing flight parameters including the group consisting of Yaw Rate, Roll Rate, Pitch Rate, Angle of Attack Rate, Angle of Attack, Sideslip Angle, Mach Number, Airspeed, Dynamic Pressure, Flap Angle, Slat Angle, Horizontal Stabilizer Position, Rudder Position, and Elevator Position;

computing a tail load estimate signal by means of formulae and tables whose inputs are said flight parameters;

submitting said tail load estimate to a band-pass filter to provide a filtered tail load estimate signal;

integrating said filtered tail load estimate signal with a first integration function to provide a first integration result, with a second integration function to provide a second integration result and with a third integration function to provide a third integration result;

comparing said first integration result with a first threshold; comparing said second integration result with a second threshold; comparing said third integration result with a third threshold; and detecting an oscillatory fault occurrence as per each of said comparisons.

2. The method of claim 1 wherein said first integration result and associated comparison reveals nuisance fault detection events avoidance.

3. The method of claim 1 wherein said second integration result and associated comparison reveals catastrophic events avoidance addressing a limit load criterion.

4. The method of claim 1 wherein said third integration result and associated comparison reveals damage addressing fatigue life criteria.

5. The method of claim 1 wherein said detecting ensures oscillations remain smaller than the aircraft oscillatory envelope.

6. The method of claim 1 wherein said reliably detecting detects fatigue life consumption and limit load-reaching events.

7. The method of claim 1 wherein said reliably detecting avoids nuisance fault detection events.

8. The method of claim 1 wherein said detecting is based on flight data other than surface oscillations.

9. The method of claim 1 wherein said detected low frequency oscillations are in the range of 0.1 Hz to 1 Hz.

* * * * *